US008193490B2

(12) United States Patent
Jertz et al.

(10) Patent No.: US 8,193,490 B2
(45) Date of Patent: Jun. 5, 2012

(54) HIGH MASS RESOLUTION WITH ICR MEASURING CELLS

(75) Inventors: Roland Jertz, Bremen (DE); Gökhan Baykut, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 360 days.

(21) Appl. No.: 12/637,184

(22) Filed: Dec. 14, 2009

(65) Prior Publication Data

US 2010/0207020 A1 Aug. 19, 2010

(30) Foreign Application Priority Data

Dec. 23, 2008 (DE) ......................... 10 2008 063 233

(51) Int. Cl.
*G01N 27/62* (2006.01)
*G01N 24/14* (2006.01)

(52) U.S. Cl. ........ 250/293; 250/290; 250/291; 250/292; 250/294; 250/296

(58) Field of Classification Search .................. 250/290, 250/291, 292, 293, 294, 296
See application file for complete search history.

(56) References Cited

U.S. PATENT DOCUMENTS 5,019,706 A 5/1991 Allemann et al.
5,477,046 A * 12/1995 Dietrich et al. ............... 250/288
6,703,609 B2 * 3/2004 Guevremont et al. ........ 250/287
6,720,555 B2 * 4/2004 O'Connor ..................... 250/291
6,784,421 B2 * 8/2004 Park ............................. 250/281
7,351,961 B2 * 4/2008 Malek et al. .................. 250/291
7,351,965 B2 * 4/2008 Wells ............................ 250/292
7,405,399 B2 * 7/2008 Wells ............................ 250/292
7,405,400 B2 * 7/2008 Wells ............................ 250/292
7,470,900 B2 * 12/2008 Wells ............................ 250/292
7,495,211 B2 * 2/2009 Franzen et al. ............... 250/291
7,598,488 B2 * 10/2009 Park ............................. 250/290
7,615,743 B2 * 11/2009 Baykut et al. ................ 250/282
7,820,966 B2 * 10/2010 Bateman ....................... 250/283
7,829,849 B2 * 11/2010 Giles ............................ 250/290
7,838,826 B1 * 11/2010 Park ............................. 250/288
8,013,290 B2 * 9/2011 Rather et al. .................. 250/281
2010/0176289 A1 * 7/2010 Franzen ........................ 250/282
2010/0207020 A1 * 8/2010 Jertz et al. ..................... 250/282
2011/0186728 A1 * 8/2011 Franzen et al. ............... 250/282
2011/0248159 A1 * 10/2011 Misharin et al. .............. 250/283

OTHER PUBLICATIONS

Brustkern, et al., "An Electrically Compensated Trap Designed to Eighth Order fot FT-ICR Mass Spectrometry", J Am Soc Mass Spectrometry, 2008, 19, 1281-1285, Elsevier, Inc.
Gabrielse, et al., "Open-Endcap Penning Traps for High Precision Experiments", International Journal of Mass Spectrometry and Ion Processes, 88 (1989) 319-332, Elsevier Science publishers B.V., Amsterdam, The Netherlands.
Nikolaev, et al., "Realistic Modeling of Ion Cloud Motion in a Fournier Transform Ion Cyclotron Resonance Cell by Use of a Particle-in-Cell Approach", Rapid Communications in Mass Spectrometry, 2007, 21: 1-20, John Wiley & Sons, Ltd.
Tolmachev, et al., "Trapped-Ion Cell with Improved DC Potential Harmonicity for FT-ICR MS", J Am Soc Mass Spectrometry, 2008, 19, 586-597.

* cited by examiner

*Primary Examiner* — David A Vanore
(74) *Attorney, Agent, or Firm* — Law Office of Paul E. Kudirka

(57) ABSTRACT

The compensation potentials on the compensation electrodes of an ICR measuring cell are sequentially adjusted so that an ICR measurement with the longest possible usable image current transient is produced. Then, subsequent ICR measurements are made using the ICR cell with the optimally adjusted compensation potentials. Depending on the kind of ion mixture involved, measurements with image current transients from 10 to more than 20 seconds long can be performed, from which mass spectra with a maximum mass resolution without peak coalescence can be obtained.

13 Claims, 7 Drawing Sheets

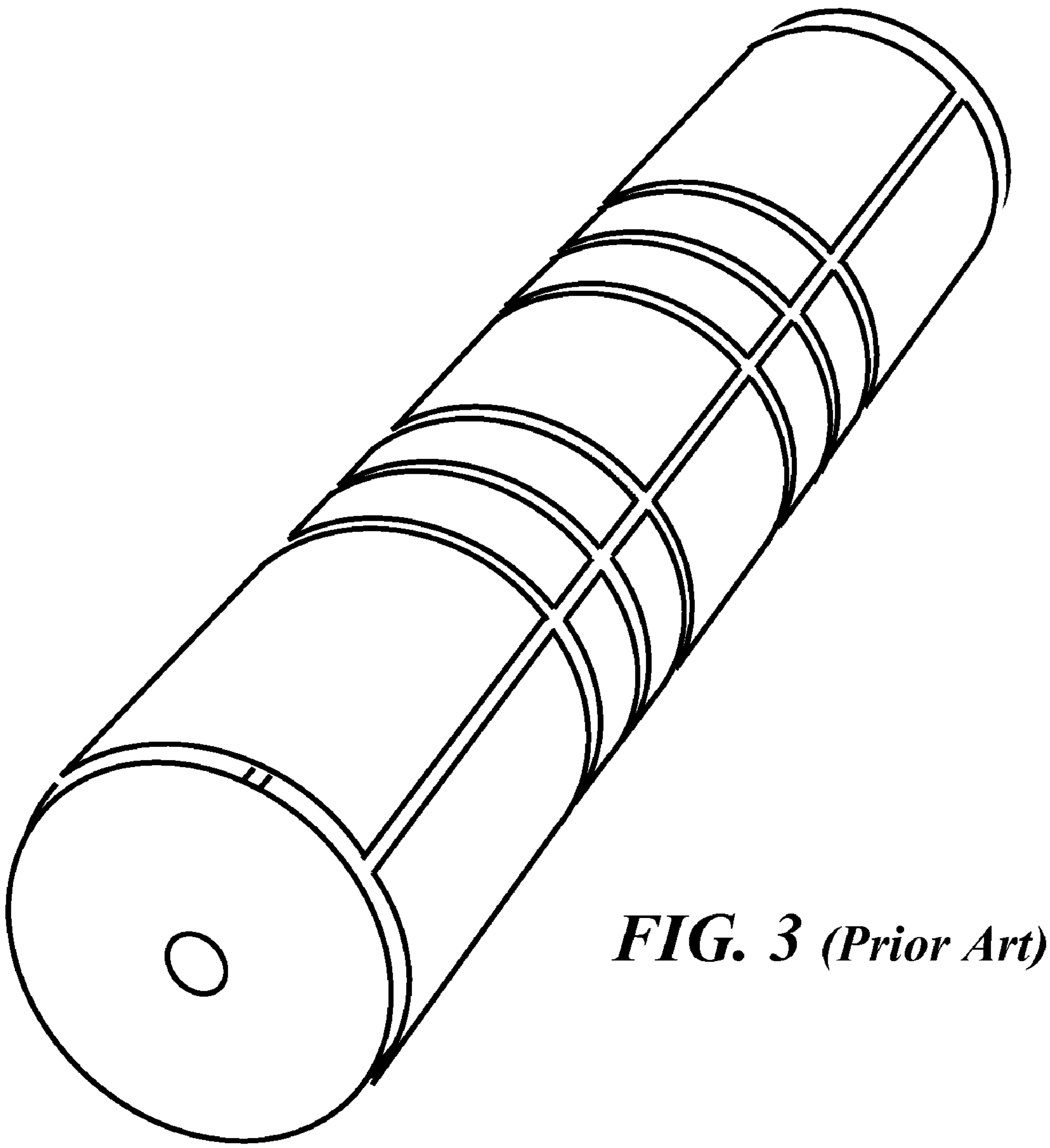
*FIG. 3* *(Prior Art)*

HIGH MASS RESOLUTION WITH ICR MEASURING CELLS

BACKGROUND

The invention refers to methods for the acquisition of mass spectra with ultra-high mass resolution in ion cyclotron resonance measuring cells. In ion cyclotron resonance mass spectrometers (ICR-MS), the charge-related masses m/z of the ion species are measured by measuring the cycling frequencies of clouds of these ion species cycling coherently in ICR measuring cells; these clouds are located in a homogenous magnetic field of high strength. The cycling motion consists of a superposition of cyclotron and magnetron motions. The magnetic field is usually created by superconducting magnet coils cooled with liquid helium. Commercial mass spectrometers nowadays offer usable diameters of ICR measuring cell up to about 6 centimeters with magnetic field strengths of between 7 and 15 tesla.

The ion cycling frequency is measured in the ICR measuring cell in the most homogenous part of the magnetic field. ICR measuring cells made according to existing technology generally consist of four longitudinal electrodes extending parallel to the magnetic field lines and enclosing the inner region of the measuring cell as a cylindrical jacket. Cylindrical measuring cells, as illustrated in FIG. 1, are used most often. Ions are usually introduced close to the axis. Two electrodes on opposite sides of the cell are used to excite these ions into cyclotron motion on larger orbits; ions having the same charge-related mass m/z are excited as coherently as possible, in order to obtain a cloud of these ions cycling in phase. The other two electrodes are used to measure the cycling frequency of the clouds of ions by their image currents, which are induced in the electrodes as the ion clouds fly by. The measuring cell is filled with ions; the ions are excited and are then detected in a sequence of procedural phases, as is known to every technical expert in the field.

Because the ratio m/z of the mass m to the number z of elementary charges on each ion (here referred to simply as "charge-related mass", or sometimes simply just as "mass") is unknown before measured, the ions are excited by a homogenous mixture of excitation frequencies. The mixture here can be distributed over time, with frequencies that rise by time (this is usually referred to as a "chirp"), or it can be a synchronous mixture of all frequencies calculated by computer (a "sync pulse").

The image current induced in the detection electrodes by the cycling ion clouds constitutes, as a function of time, a so-called "transient". The transient is a signal in the "time domain", and usually decreases within a few seconds until only noise remains. In measuring cells of classic design, durations of the usable transients show a maximum of about four seconds. When the simple term "duration" is used below in connection with a transient, always the "useful duration" until only noise remains is meant.

The image currents of these transients are amplified, digitized and then subjected to Fourier analysis to determine the cycling frequencies of the ion clouds of various masses contained within them. The Fourier analysis transforms the sequence of the image current values measured originally for the transients from the "time domain" into a sequence of frequency values in the "frequency domain". The charge-related mass m/z and their intensities are determined from the peaks of the frequency signals for the various ion species detectable in the frequency domain. As a result of the highly constant magnetic fields used, and of the high precision with which frequency measurements can be obtained, an extremely precise determination of the mass can be achieved. ICR-MS is also referred to as "Fourier transform mass spectrometry" (FTMS), although it should be noted that nowadays other types of FTMS are known that are not based on the cycling of ions in magnetic fields. At present, Fourier transform ICR mass spectrometry (properly abbreviated to FT-ICR-MS) is the most accurate of all mass spectrometry methods. The precision with which the mass can be determined ultimately depends on the number of ion circulations that can be acquired during the measurement.

When the term "acquiring an ICR mass spectrum" or a similar formulation is used below, this includes, as any technical expert knows, the full sequence of steps from filling the ICR measuring cell with ions, exciting the ions to cyclotron motion, measuring the image current transients, digitization, Fourier transformation, determination of the frequencies of the individual ion species, and finally calculation of the charge-related masses and the intensities of the ion species represented in the mass spectrum.

In order to introduce the ions into the ICR measuring cell, and particularly in order to confine them, a variety of methods such as, for instance, the "side-kick" method or the method of dynamic confinement through rising potentials are known, but these will not be discussed in more detail here. The technical expert in this field is familiar with these methods.

Accurate and precise mass determination is extremely important in modern biological mass spectrometry. No limit is known for the mass precision beyond which no further increase in the information content could be expected. Increasing mass precision is therefore a target to be pursued continuously. A high mass precision alone, however, is often not sufficient to solve a given analytical task. In addition to a highly precise measurement of mass, a high mass resolving power is particularly critical, since, above all in biological mass spectrometry, it is often necessary to separately detect and measure ion signals with very small differences in mass. For instance, the enzymatic digestion of mixtures of proteins gives rise to thousands of ion species in one mass spectrum; it is often necessary to separate and accurately measure five, ten or more different ion species in a small interval around a nominal mass number.

In the cylindrical measuring cells that are used today, the cell is formed from four longitudinal electrodes, as illustrated in FIG. 1. Cylindrical measuring cells are used most frequently, primarily because they offer the best possible exploitation of the volume in the magnetic field from a round coil. The image currents from tight clouds of ions of one mass generate a curve with almost rectangular amplitudes when they move close to the detection electrodes. But the smearing of the ion clouds always observed until now on the one hand, and the distance of the ion circulation tracks from the detection electrodes selected by the excitation conditions on the other hand, result in substantially sinusoidal image current signals for each ion species, from which a Fourier analysis can easily determine the cycling frequency and therewith the mass.

Because the ions can move freely in the direction of the magnetic field lines, it is necessary to prevent the ions from leaving the measuring cell. The ions always have a velocity component in the magnetic field direction from their capturing process. For this reason, the two ends of the measuring cell are fitted with electrodes known as "trapping electrodes". DC potentials are usually applied to them to repel the ions and hold them inside the measuring cell. Various shapes are known for this electrode pair; in the simplest case, they are planar and have a central hole, as shown in FIG. 1. The hole is used to insert the ions into the measuring cell. In other cases, further electrodes with the shape of cylindrical jacket segments are attached beyond the ends of the measuring cell, continuing the central cylinder jacket segments at both ends, and with trapping voltages applied to them. This then creates an open cylinder without cylinder covers at the ends, as shown in FIG. 2; these are referred to as "open ICR cells".

Looking at the potential distribution along the axis of the measuring cell, the ion-repelling potentials of the outer trapping electrodes (compared to the potential of the longitudinal electrodes) create a potential well in the centre of the measuring cell, both in the case of apertured diaphragms and of open ICR cells. The curve of the potential along the axis has a minimum precisely in the centre of the measuring cell if the potentials of the two trapping electrodes that repel the ions are equal in magnitude; in the immediate neighborhood of the centre this potential curve is parabolic, and therefore harmonic. At greater distances from the centre, the potential curve deviates increasingly from the parabolic form. The injected ions will execute axial oscillations in this potential well, the so-called trapping oscillations, as they have a velocity in the axial direction resulting from their injection. Provided the ions are not given any additional kinetic energy in radial direction, the strong magnetic field holds the ions on the axis, preventing any radial deviation.

The amplitude of the trapping oscillations depends on the kinetic energy associated with their axial velocity. If the amplitudes are small enough that the ions do not leave the strictly parabolic region of the potential minimum, their oscillation is "harmonic", in which case the oscillation frequency does not depend on its amplitude. This is no longer true for larger oscillation amplitudes that take the ions beyond the parabolic region of the potential minimum; in this case the oscillation frequency depends on the amplitude.

It should, however, also be noted here that while the trapping potentials have a minimum along the axis, the potentials in the radial direction fall away towards the longitudinal electrodes. The minimum in the axial direction is, considered in three dimensions, a saddle; the trapping potential falls radially, i.e. perpendicular to the axis, towards every side. In three dimensions, the precise shape of the potential distribution forms a spatial quadrupole field, at least in the immediate neighborhood of the saddle. As has already been mentioned, the ions that are introduced to the axis are unable to deviate to the sides due to the strong magnetic field until they absorb additional energy from oscillating electrical excitation fields and are lifted onto the cyclotron tracks.

The trapping potentials that are the cause of the trapping oscillations change the frequencies of the cycling motion of the ions, and therefore have an effect on the determination of mass. The measured orbit frequency $\omega_+$ (the "reduced cyclotron frequency") of an ion species in the absence of additional space charge effects, i.e. when there are only very few ions in the ICR measuring cell, is given by $$\omega_+ = \frac{\omega_c}{2} + \sqrt{\frac{\omega_c^2}{4} - \frac{\omega_t^2}{2}},$$

where $\omega_c$ is the undisturbed cyclotron frequency, and $\omega_t$ is the frequency of the trapping oscillation. It can be seen from this that it is favorable for the trapping oscillations to provide a harmonic electrical trapping potential with a potential well that is precisely parabolic even well beyond the centre, as only then the frequency $\omega_t$ of the trapping oscillations, and therefore of the measured orbit frequency $\omega_+$, is well-defined. It is therefore favorable to have an accurately quadrupolar potential distribution even well away from the centre. It is only if the frequency $\omega_t$ of the trapping oscillations is well-defined and independent of its (accidental) oscillation amplitude that the reduced cyclotron frequency $\omega_+$ is also well-defined and that high precision can be expected from the charge-related mass m/z that is determined from it.

The frequency $\omega_t$ of the trapping oscillations affects the reduced cyclotron frequency $\omega_+$ through a somewhat complicated mechanism. When the ions are excited through circular accelerations into cyclotron motion, the electrical field components of the trapping field in a radial direction generate a second type of motion in the ions: circular magnetron motion. Magnetron circulation is a circular movement around the axis of the measuring cell, but is usually much slower than circular cyclotron movement and, following successful excitation, has a much smaller radius. The effect of the additional magnetron circulation is that the centre of the circular cyclotron movements moves around the axis of the measuring cell at the magnetron frequency, so that the tracks of the ions describe cycloidal motions. Only through this magnetron circulation does the trapping field have an effect on the cyclotron movement, resulting in a reduced cyclotron frequency $\omega_+$.

There is agreement amongst most experts that in order to provide the most ideally harmonic trapping oscillations possible, an ideal trapping potential should adopt the form of a three-dimensional quadrupolar field as accurately as possible even outside the immediate vicinity of the centre. Excited ions can then oscillate harmonically, parallel to the axis of the measuring cell, even during their cyclotron motion. A quadrupolar trapping field of this sort can most easily be generated by rotationally hyperbolic end cap and ring electrodes, geometrically similar to those of a three-dimensional Paul high-frequency quadrupole ion trap; but then acceleration to cyclotron motion is difficult.

The design of an ICR measuring cell for proper function therefore involves a difficult dilemma. On the one hand, the demand for a quadrupolar distribution of the trapping potentials calls for a measuring cell that can optimally be made only with rotationally hyperbolic end cap and ring electrodes; on the other hand, exciting the ions in an extended ion cloud to cyclotron motion demands for very long electrodes parallel to the axis. It is very difficult to satisfy both of these demands at the same time.

A practical solution was first published in the work of G. Gabrielse et al., "Open-Endcap Penning Traps for High Precision Experiments", (I J Mass Spectrom & Ion Processes, 88 (1989), 319-332). The authors introduced compensation electrodes into an open ICR measuring cell. Measuring cells with five segments were described, with which, according to mathematical calculations, good approximations to broad quadrupolar trapping fields could be achieved.

There have recently been two further attempts to create trapping potentials in open ICR measuring cells that reproduce as closely as possible the three-dimensional quadrupolar field of an ideal ICR measuring cell in a larger area around the centre, in order to generate harmonic trapping oscillations. In both papers, the approaches to solve the dichotomy between hyperbolic and cylindrical measuring cells again were made with the aid of compensation electrodes; more compensation electrodes were used here than were by Gabrielse et al. In both of these projects, the favorable potentials at the compensation electrodes were determined through computer simulations.

In the paper by A. V. Tolmachev et al., "Trapped-Ion Cell with Improved DC Potential Harmonicity for FT-ICR MS" (J Am Soc Mass Spectrom 2008, 19, 586-597) an attempt was described to optimize the DC potentials in a measuring cell simulated in a computer, using electrode segments of given widths in order to achieve the smallest possible deviations from the theoretical values of a quadrupolar distribution for the radial potential E/r, normalized to the radius r, over a broad region around the centre. Both for the purposes of simulation and later in the construction of a real measuring cell, seven segments with relative widths of 10, 2, 2, 5, 2, 2, and 10, each having four longitudinal electrodes were used, together creating a long cylinder with a total of 4×7=28 longitudinal electrodes. In order to excite the ions into cyclotron motion, two ensembles of longitudinal electrodes extending across all seven segments were used. The DC potentials that had been found optimal in the simulation were used for measurements using the physically constructed measuring cell. The mass precision that could be achieved with this measuring cell was in fact outstanding at 50 ppb (parts per billion), although only relatively short segments of the transients, with a maximum of just two seconds, but in most cases only between 0.2 and 0.5 seconds, were used for the Fourier transformations. Nothing was reported about the mass resolutions; however, with such short transient periods they cannot be extraordinarily high, as the mass resolution is always proportional to the number of oscillation periods measured.

Another attempt to minimize the deviations between simulated and ideal quadrupole fields as effectively as possible was made in the work of A. M. Brustkern et al., "An Electrically Compensated Trap Designed to Eighth Order for FT-ICR Mass Spectrometry", (J Am Soc Mass Spectrom 2008, 19, 1281-1285), again using the field of a simulated measuring cell, but in this case having a total of nine segments. The three compensation electrodes used on each side of the central segment were very narrow here. Unfortunately, the work does not report any exact measurement parameters for the mass spectrometry experiments; among other things it can only be assumed that cooled ion clouds were used, generated by pulses of injected nitrogen and then in part excited again into coherent trapping oscillations. The reported mass resolution of 17 million for [$Arg^8$]-vasopressin with a mass of 1084.5 dalton can, in all probability however, be traced to a peak coalescence (see below) or to an associated "phase locking"; these must be avoided in normal operation, as they cause the signals of a number of neighboring masses to be pushed together into a single signal of apparently high resolution. Although the objectives for optimization can be found from this work, the absence of detail it provides about the measuring parameters unfortunately means that it cannot be used for comparison of the success in terms of mass resolution and precision.

The works mentioned above both aim at creating an ideal quadrupolar field distribution for the trapping potential. A field distribution of this type is undoubtedly ideal for small numbers of ions in the measuring cell. It is, however, questionable whether this field distribution is also ideal when a large number of ions, of the order of some tens of thousands up to a hundred thousand ions, are injected into the measuring cell, as is necessary for quantitative analyses.

Additional effects occur if large numbers of ions are injected into the ICR measuring cell. The ions, due to the many elastic impacts with other ions, are again and again pushed to the side by their trapping oscillations, whereby a component of the velocities that were originally aligned with the axis are always converted into cyclotron motions with tiny radii of much less than a millimeter. The impacts between the ions therefore lead, over periods in the order of a second, to a redistribution of the kinetic energy of the originally wide trapping oscillations over the degrees of spatial freedom, similar to thermalization in a collision gas. As a result, the thin, long, cigar-shaped ion cloud is shortened, and the ions do no longer widely oscillate between the trapping electrodes.

If the ions are very heavy, that is if they consist of hundreds of atoms, then semi-elastic impacts may even increase the internal energy, bringing a loss of kinetic energy and thus resulting in a further shortening of the ion cloud. This effect has not, however, yet been investigated; it probably has a very long time constant. An effect of this sort could lead to a kind of "crystallization" of the ions in the ion cloud, as regularly occurs in quadrupole high-frequency ion traps after thermalization of the ion movements with a damping gas. By this crystallization the ions in the cloud are practically confined to a fixed position, and only few exchanges of positions take place.

A further effect that occurs when very high numbers of ions are present in the ICR measuring cell is that ion clouds of very similar masses coalesce in their cyclotron track, resulting in peak coalescence. Following excitation, the clouds of ions of different masses with different cyclotron frequencies orbit around the same cycling track. Ion clouds with almost the same cyclotron frequencies (almost identical masses) thus remain together on this track for relatively long periods. They only separate very slowly and the repelling electrostatic forces between the two clouds act on each other for a very long time. Under the influence of the repelling electrical field, the two clouds begin to rotate (gyrate) around the centroid of their common charge. The cyclotron circulation and this rotation together create cycloidal paths; due to their slightly different cyclotron motion speed, the two clouds are repeatedly brought together again. They lock to one another in this way. The effect depends on the strength of the repulsion between the ion clouds, that is on the number of ions in the two (or more) ion clouds. In this way, the two ion clouds behave as one unit on the cyclotron track, causing a single image signal instead of two separate signals. Thus two (or even more) ICR signals coalesce to a single, often very sharply defined, signal.

Sometimes this peak coalescence involves the different signals from one ion species formed by the different $^{13}C$-satellites and which therefore differ by one mass unit. Particularly often it involves the fine structure of these $^{13}C$-satellites with one and the same nominal mass unit, but which also contains some of the isotopes $^{2}D$, $^{15}N$, $^{18}O$ or $^{34}S$, and whose signals can only be separated with a particularly high mass resolution. The ion signals from two different substances having the same nominal mass number can also be affected by this. Particularly sharply defined signals produced by peak coalescence can easily be looked upon as high-resolution ICR signals, but they do not contain correct analytical information, and they falsify the determination of mass.

This peak coalescence usually only occurs when the density of ions is high. Since the clouds of excited ions in the ICR cell have the shape of a thin cigar whose length depends on the trapping potential, the ion density rises if the trapping potential is increased, and coalescence can then occur with a smaller number of ions. It is not known whether peak coalescence also depends on the shape of the ion clouds, the width of the cyclotron tracks or on other parameters.

The cycling frequency of the clouds for each species of ion can be determined from a Fourier transform of the image current transients. The accuracy with which the frequency can be determined always rises with the duration for which the image currents are measured. The times over which cyclotron motion of the ions can be measured are, however, limited; in commercial ICR mass spectrometers they frequently have a maximum of four seconds. Over this period, the amplitude of the image currents (the transient) has usually dropped to such a level that noise predominates, and extending the measuring time no longer brings any improvement to the frequency determination. The mass resolution is therefore also no longer improved.

The vacuum inside the measuring cell must be as good as possible, as the ions must not undergo impacts with residual gas molecules during the image current measurement period. Every impact between an ion and a residual gas molecule puts the ion more or less out of the phase of the other ions with the same charge-related mass. Due to loss of phase homogeneity (coherence) the image current amplitudes decrease and the signal-to-noise ratio continuously deteriorates, so shortening the usable transient duration. The measurement should be taken over at least a few hundred milliseconds, ideally over many seconds. This requires vacua in the range of between $10^{-7}$ and $10^{-9}$ pascal.

The work of E. N. Nikolaev et al., "Realistic modeling of ion cloud motion in a Fourier transform ion cyclotron resonance cell by use of a particle-in-cell approach" (*Rapid Comm. Mass Spectrom.* 2007, 21, 1-20) has shown by extensive computer simulations that even in an ideal vacuum, the initially cigar-shaped clouds of ions of the same mass per unit charge change their shape continuously as they circulate. In ICR measuring cells with apertured trapping diaphragms at the ends, the cigar-shaped clouds develop tails from their ends or from the centre, depending on the conditions, and these are dragged along the cycling path behind the clouds. Tails developing from the centre initially create a form reminiscent of a broad tadpole. The tails continue to lengthen until they become entire rings that no longer contribute to the detection of the image currents. The heads of the tadpoles simply become thickenings in the ring-shaped cloud of cycling ions, and gradually disappear entirely. At this point the usable measuring time has come to an end, as the image currents no longer contain any alternating components for this species of ions; it is only from these that the frequencies of the cyclotron rotations can be determined.

The reason why these tails develop has not yet been explained, but probably depends on the space charge of the individual ion clouds in association with the shape of the trapping potentials. Strongly repelling forces are present within the ion clouds and attempt to push the clouds apart. In a strong magnetic field, these forces cause the cloud to gyrate about its own axis; the gyration develops in such a way that the repulsive space charge, the additional centrifugal force, and the Lorenz force are in balance with one another. As a result, variations in density or other effects can lead to imbalances with protuberances. Interestingly, the fact that the various clouds of ions of different masses continuously overtake one another as they cycle, and must therefore repeatedly pass through each other, plays hardly any part.

SUMMARY

The invention is based on a recent discovery that in an ICR measuring cell filled with a usefully high number of ions, the potential distribution that will hold the cycling clouds of ions together for a long period must be different from that of an ideal quadrupolar potential distribution. Holding cycling clouds of ions together for a long time results in usable transients of long duration, and this in turn brings high mass resolution.

The invention first provides an optimization method for adjusting the compensation potentials for maximum mass resolution in an ICR measuring cell with compensation electrodes of given geometric dimensions. The method of adjustment consists in optimizing the potentials at the compensation electrodes in appropriate series of measurements in such a way that the measurements of the image currents yield the longest-lasting usable transients. This "optimization method for the potentials at the compensation electrodes" will be referred to below briefly as "adjusting the potentials" or "potential adjustment".

The duration of the usable part of the transient can easily be determined visually, as well as by computer-aided analysis. Computer-aided analysis allows to program fully automatic optimization procedures. Optimization for long transients is significantly easier than optimizing for maximum resolution, since the latter methods require different Fourier transformations for different quantities of data, depending on the duration of the transients.

The measuring cell must be refilled with ions for each of the repeated measurements of the transients used for this optimizing adjustment. It has been found helpful to control the equipment in such a way that the number of ions is held as constant as possible. It is favorable to use a large number of ions.

With the measuring cell adjusted in this way, the ICR mass spectra are acquired in the usual way, whereby the measuring cell is favorably filled each time with the same number of ions as were used for the potential adjustment. If the full usable duration of the transients is used for the Fourier transform, the mass spectra demonstrate the desired ultra-high mass resolution. Acquiring of the ICR mass spectra can then be carried out as often as desired on the same or on different mixtures of ions. It is only necessary to repeat the adjustment of the potentials at the compensation electrodes if the conditions of the process, for instance the number of ions with which the cell is filled or the range of ion masses, are significantly changed.

The invention furthermore provides a method for the design of an ICR measuring cell with compensation electrodes with which a particularly high resolution can be obtained. This method consists in optimizing the number and lengths of the segments of the ICR measuring cell. The optimization is carried out with the intention that, after the optimizing adjustment of the potentials at each of the electrode designs, the longest possible usable transient duration is obtained.

The optimizing adjustment aims at the longest possible usable transients. In other words, in contrast to the approach taken in the publications quoted above, no attempt is made to generate an ideal quadrupolar trapping field; the method searches instead for a trapping field that will hold the ions in each of the ion clouds stable on their cycling tracks for as long as possible. Surprisingly, in spite of the large numbers of ions in the ICR measuring cell, which is filled to very high levels of about 100,000 ions, the signal peaks show hardly any coalescence.

To the extent that our work used an ICR measuring cell with compensation electrodes whose dimensions accord with those used by Tolmachev et al., the optimizing adjustment resulted in potentials for the compensation electrodes that differed from those of Tolmachev et al. in a characteristic way. Potentials were obtained for the two pairs of compensation electrodes which, measured in relation to the trapping potentials of the outermost electrode segments, were slightly but significantly higher than the potentials of Tolmachev et al. The small change in the potentials had, however, a significant effect on the duration of the transients and on the achievable resolution. The potentials adjusted in this way were also in all cases different from the potentials that were found in our own simulations for an ideal, quadrupolar potential distribution. This therefore confirms that a potential distribution other than an ideal quadrupolar distribution is needed to hold the clouds of ions together for a long time.

Transients with usable durations extending from 10 to 20 seconds or more were achieved. This yielded previously unobtainable mass resolutions both for the mass spectra of individual substances with a small number of different ion species, and also for complex ion mixtures. Thus, for instance, for the hard-to-measure isotope signal of the ions of BSA (bovine serum albumin) with 49 charges, in a magnetic field of seven tesla and a mass m/z=1350 u, a previously unattained resolution of R=800,000 was achieved, whereby it was possible to add together 200 individual spectra (see FIG. 6). Single spectra of reserpine yielded, without peak coalescence, a resolution of R=6,000,000 at B=7 T, from a transient that had scarcely decayed at all over 20 seconds. FIGS. 4 and 5 illustrate, again with only seven tesla, the effectively resolved fine structures of each of the second $^{13}C$-satellites for the double-charged ions of [$Arg^{8}$]-vasopressin and substance P, in comparison, in each case, to the theoretically calculated fine structures.

Even if, rather than using the full duration of these long transients for the Fourier transform, a duration of, for example, one second is taken, the mass resolution achieved is better than the corresponding resolution from uncompensated or incorrectly compensated ICR measuring cells that yield only shorter transients.

BRIEF DESCRIPTION OF THE DRAWINGS

FIG. 3 shows the same ICR measuring cell as FIG. 2, but with apertured diaphragms that screen it at the ends. ICR measuring cells of this type are preferably used for this invention, because they keep the electrical fields of the electrical feed lines out of the inside of the ICR measuring cell.

FIG. 4*d* shows the calculated fine structure.

FIG. 5*a* shows the 26 seconds of transient, while FIG. 5*b* illustrates a narrowband part from a mass spectrum of substance P, with molecular composition $C_{63}H_{100}N_{18}O_{13}S$. The narrowband mass spectrum exhibited a mass resolution of R=2,500,000. The monoisotopic signal of the double-charged molecule ion and three $^{13}C$-satellites can be seen in the mass spectrum. FIG. 5*c*, a magnification of part of FIG. 5*b*, shows the fine structure of the second $^{13}C$-satellite; for comparison, FIG. 5*d* shows the computed fine structure. The signals of the fine structure extend over only about eight thousandths of one atomic mass unit, which is about 10 ppm of the mass. Fine structures of this sort allow for the determination of the elementary composition of biological molecules of high mass.

FIG. 7*a* shows the transient with its "beats", while below (7*b*) is the narrowband mass spectrum of the entire isotope group of the ions with 49 charges; below that, (7*c*) is a zoom extending over only two mass units, while below that, as (7*d*) is a further zoom of a section representing only 0.030 atomic mass units which nevertheless contains 15 ion signal peaks for the individual isotope satellites. The mass resolution is R=800,000. All the measurements were made in a magnetic field of seven tesla only. The BSA mass spectra illustrated here are not calibrated to precise masses, and therefore differ from the true values.

FIG. 7*a* shows the transient extending usefully over 14 seconds, and having a strong "beat". The "beat" results from the strong periodicity of the ion signals. The ion clouds that are lifted onto the cyclotron track together are at first close to one another, and generate strong image currents. They then spread apart and distribute themselves, over a long period of time, almost continuously over the entire circulation path; their image signals then practically cancel each other out, similarly to interference. Only when, after many circuits, all of the ion clouds are close together again is another "beat" generated in the image current.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 1:
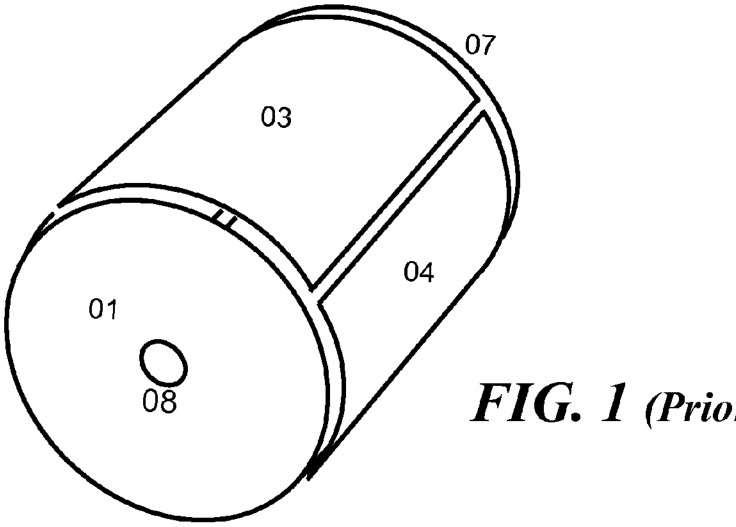
FIG. 1 (Prior Art)
FIG. 1 illustrates a cylindrical ICR measuring cell according to the prior art. Between the two trapping electrodes (01) and (07), here having the form of apertured diaphragms, there are four longitudinal electrodes (02-05) in the form of cylindrical jacket segments, although only two longitudinal electrodes (03, 04) are visible in this view. Of these four longitudinal electrodes, two that face one another, for instance electrodes (03) and (05), are used to excite the ions into cyclotron paths, while the other two are used to measure the image currents.
Figure 2:
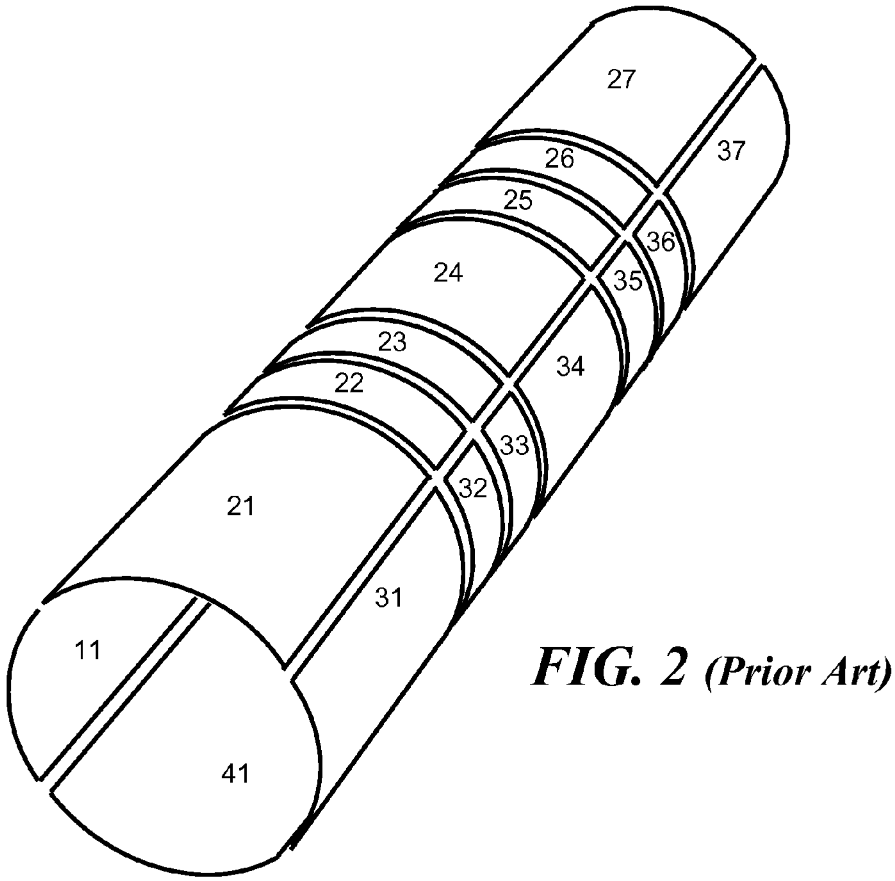
FIG. 2 (Prior Art)
FIG. 2 illustrates an open ICR measuring cell which can be used for this invention, cylindrical in form and with a total of seven segments. The divided longitudinal electrodes are arranged in four rows, of which here only the upper rows (21-27) and (31-37) are fully visible. Trapping voltages applied to the longitudinal electrodes in each of the three outer segments keep the ions confined to the region of the central longitudinal electrodes (of which electrodes 24 and 34 are shown in the figure). Excitation is provided by a chirp or sync pulse at opposing rows of longitudinal electrodes, for instance the row (21-27) and the row which starts with electrode 41 and is not fully visible here. This provides uniform excitation to all the ions in the central section. Because the clouds favorably remain only in the central segment, measurement of the image currents can be carried out by, for instance, the longitudinal electrodes alone (14, not visible) and (34); the other longitudinal electrodes located further out do not have to be included, as they will only contribute to the signal noise.

The invention provides methods with which ICR measuring cells with compensation electrodes can be designed and adjusted in such a way that an extremely high mass resolution is achieved when acquiring mass spectra. ICR measuring cells with compensation electrodes are long measuring cells with constant cross sections, cubic or cylindrical for example, whose four or more electrodes are each divided into at least five segments. FIG. 2 shows, as an example, a cylindrical seven-segment measurement cell with four longitudinal electrodes. The central segment (24, 34) holds the ion cloud, while the trapping potentials are applied to the electrodes of the segments at the ends (21, 31) and (27, 37). The electrodes in the segments between the central segment and the end segments are the compensation electrodes; the measuring cell in FIG. 2 has two segments with compensation electrodes (22, 32, 23, 33, 25, 35, 26, 36) on either side of the central segment. The ICR measuring cells may also have apertured diaphragms attached to the ends as screening electrodes, as shown in FIG. 3.

The ICR measurement cells generally consist of four rows of longitudinal electrodes; two rows of electrodes, opposite one another, are used to excite the ions that are assembled in a narrow cloud along the centre and raise them to wide cyclotron paths, while some or all of the electrodes in the two other rows of electrodes, again opposite one another, are used to measure the image currents. It is also, however, possible to use ICR measuring cells with more than four rows of longitudinal electrodes, for instance with eight rows of longitudinal electrodes, whereby in a well-known manner the four rows of measuring electrodes can be used to double the measured orbit frequency for the image currents, so doubling the achievable resolution. This doubling, however, is only possible as long as the ion clouds have not extended so widely that they extend over multiple measuring electrodes. It is, of course, also possible to use twelve or sixteen rows of longitudinal electrodes. The use of six or 10 rows is equally possible, but does require special measures for merging the image current signals. (Capacitively coupled plates. Excitation on trapping electrodes with trapping potentials.)

Figure 8:
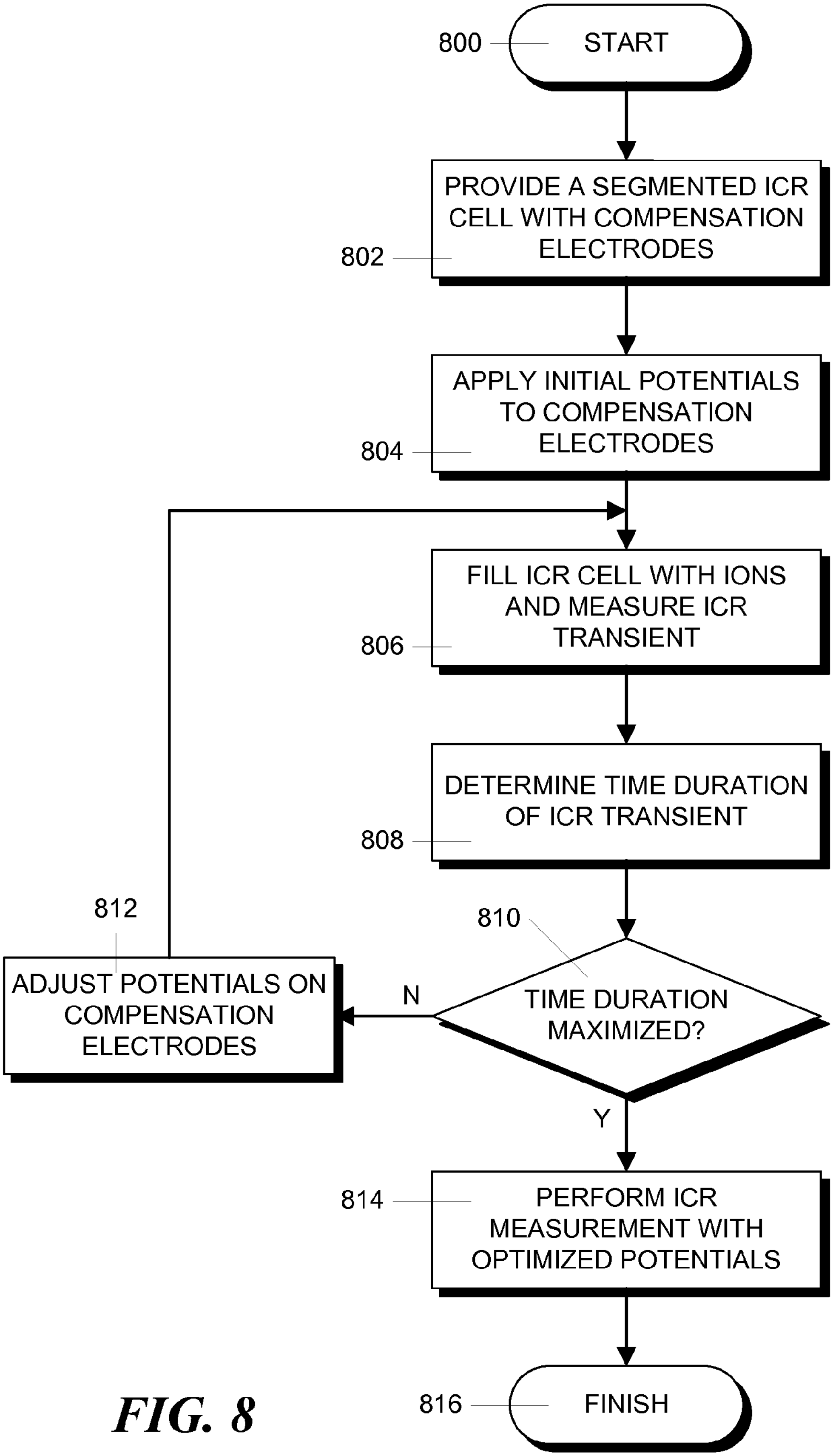
FIG. 8 is a flowchart showing steps in an illustrative method according to the principles of the invention.

Basically, the invention provides a method for optimally adjusting the potentials at the compensation electrodes of an existing ICR measuring cell that has compensation electrodes. A preferred embodiment of the method is depicted in FIG. 8. This process starts at step 800 and proceeds to step 802 where a segmented ICR measuring cell with compensation electrodes is provided as described above. In step 804 an initial set of potentials is applied to the compensation electrodes. Although a variety of potentials could be used as a starting point, suitable starting potentials are those conventionally used in the prior art. Next, in step 806, the ICR cell is filled with ions and an ICR transient (signal in the time domain) is measured using the starting potentials. Then, in step 808, the duration of the measured ICR transient in the time domain is determined. In step 810 a determination is made whether the time duration of the measured ICR transient has reached a maximum. If not, in step 812, the potentials at the compensation electrodes are adjusted and the process proceeds back to step 806 where another measurement is performed. Steps 806, 808, 810 and 812 are repeated until a maximum time duration is determined in step 810. The method of searching for the most favorable adjustment consists in optimizing the potentials at the compensation electrodes in appropriate series of measurements in such a way that the measurement of the image currents yields the longest-lasting possible usable transients. In step 814, the optimized potentials are used to perform subsequent ICR measurements thereby resulting in measurements with the longest usable transient durations and, accordingly, the highest mass resolution. The process then finishes in step 816. As was already indicated above, the "method for optimizing the adjustment of the potentials with the aim of maximum mass resolution" will be referred to below more briefly as "adjusting the potentials" or simply "potential adjustment".

To achieve the maximum possible mass resolution, the ICR mass spectrometers are always operated in what is called a "narrowband mode", in which only a small section from the full mass spectrum is measured at any one time, as is familiar to the technical expert. Commercial ICR mass spectrometers offer this narrowband mode in addition to a broadband mode that allows mass spectra to be measured over a wide range of masses. The invention is primarily aimed at achieving the maximum resolution in this narrowband mode, but at the same time does also provide better resolution in the broadband mode.

It is advantageous for the optimization that the usable duration of the transients changes greatly in response to a small change in the potentials; there is, in other words, a marked optimum. It is also advantageous that the duration of the usable part of the transient can easily be determined either visually or through computer-aided analysis. Computer-aided analysis allows a fully automatic optimization procedure to be programmed.

Optimization for long transients is significantly easier than directly optimizing for maximum resolution, since the latter, depending on the duration of the transients, require different Fourier transformations dependent on the available quantities of data, which change with the duration of the transients. An optimization process that is oriented directly around achieving the maximum possible resolution is significantly more difficult, although not impossible. One can, for instance, always use a Fourier transform for a large data set, for instance for 512 thousand data points, regardless of the usable duration of the transient, which, however, slows down the calculation process. The corresponding method steps are the same as the method steps depicted in FIG. 8, except for steps 808 and 810, where the mass resolution has to be determined in the frequency domain and maximized instead of the duration of the ICR transient in the time domain. Optimum adjustment means that with the optimized potential set found in this way, subsequent spectrum acquisitions can achieve a maximum mass resolution without signal peak coalescence.

The optimization method of the optimizing adjustment for the longest possible useful image current transients, aims to find a trapping field that holds the ions in the individual ion clouds on their cycling path stably together for as long as possible. This means that, in contrast to the work of Tolmachev et al. and of Brustkern et al. quoted above, no effort is made to generate an ideal quadrupolar trapping field. For a given electrode geometry, the potentials obtained from the two different optimization targets only differ from each other relatively slightly, but the small difference is of crucial significance for success. This therefore confirms the discovery that in order to hold the ion clouds together for a long time it is necessary to use a potential distribution in the ICR measuring cell that is slightly—but nevertheless significantly—different from an ideal quadrupolar distribution. The invention is based on this discovery.

The fact that after this adjustment the signals demonstrate hardly any coalescence in spite of large numbers of ions in the ICR measuring cell, even extending to ion fillings with about 100,000 ions, was not to be expected; it is therefore surprising and makes the invention particularly valuable. Only through extremely precise measurement of the frequency spacings of signals from two ion species of almost identical mass is it possible to demonstrate that the frequencies have approached each other by a very small amount. This approach is reproducible, and can be taken into account for accurate mass determination through corresponding corrections.

The optimizing adjustment requires a number of measurements of the image current transients to be made while varying the values of the potentials. The ICR measuring cell must always be refilled with ions for each single measurement. It has been found that to achieve optimization quickly and unambiguously, suitable control methods should be used to ensure that the number of ions is as constant as possible. This now specified number of ions must also be used for the subsequent acquisitions of the mass spectra if optimally high mass resolution is to be achieved. For the sake of a high dynamic measuring range within the mass spectra, it is favorable to have a large number of ions in the ICR measuring cell. It is thus also favorable to use a large number of ions for the potential adjustment.

ICR mass spectra acquisitions are then made in the usual way using the measuring cell that has been adjusted in this way. The mass spectra also show the desired high mass resolution with other mixtures of ions, at least if the full duration of the transients is used for the Fourier transform. But even if the full duration of these long transients is not used for the Fourier transform, the achieved mass resolution is better than the corresponding resolution from ICR measuring cells the potentials of which are not optimally adjusted and deliver shorter transients. If it is necessary to acquire series of mass spectra in a rapid sequence, as for instance when coupled with high-performance liquid chromatography (HPLC), the transients may only have to be acquired for shorter times, for instance for just one second each, in which case the invention nevertheless still delivers improved mass resolution. There are limits on the shortness of transient measuring times for transients showing a strong "beat" (see below).

ICR mass spectra can then be acquired as often as wanted; it is only necessary to readjust the potentials of the compensation electrodes if the process conditions change significantly. Process conditions that will have an effect include, for instance, the number of ions used for filling, as they determine the space charge within the ICR measuring cell.

The invention moreover provides a method for optimizing the design of an ICR measuring cell with compensation electrodes, whereby the aim of the design here again is to be able to acquire mass spectra in an ICR measuring cell with particularly high mass resolution. This method consists in optimizing the number and lengths of the segments of the ICR measuring cell. The optimization is carried out by manufacturing a series of ICR measuring cells with varied numbers and lengths of compensation electrodes, then of carrying out an adjustment of the potentials at the compensation electrodes for each of these ICR measuring cells, and then selecting the ICR measuring cell that altogether delivers the longest usable transients as shown in FIG. 8.

This very time-consuming and expensive optimization method can be considerably simplified. Thus computer simulations can first be used to find the geometrical dimensions of an ICR measuring cell and its compensation electrodes that can form an ideal, quadrupolar trapping potential distribution over the largest possible area. This ICR measuring cell is built and used as the starting point for adjusting the potentials on the compensation electrodes to obtain long transients. This method makes the assumption that the geometric shapes of a measuring cell for an ideal quadrupolar field and for holding the ion clouds together for a long period are almost identical. The ICR measuring cell formed in this way can, however, also be used as the initial shape for further geometrical variations.

In our experiments, in most cases ICR measuring cells were used that were very similar to those used by Tolmachev et al. With an internal diameter of 6 cm, they had four longitudinal electrodes with seven segments having lengths of 6.0 cm, 1.2 cm, 1.2 cm, 3.0 cm, 1.2 cm, 1.2 cm and 6.0 cm. A measuring cell of this type is illustrated in FIG. 2. They were used, however, with screening flat electrodes at the ends, as illustrated in FIG. 3. The potentials, adjusted for a trapping voltage of 1.0 V, were 1.0 V, 0.22 V, 0.12 V, 0.0 V, 0.12 V, 0.22 V and 1.0 V.

All the measurements were made in a magnetic field of only 7 tesla; in superconducting magnets available nowadays, with magnetic flux densities of 11 or 15 tesla, correspondingly higher mass resolutions can be achieved.

For substances with a range of molecular weights from 500 u up to around 2000 u, which deliver the greatest numbers of ions of suitable levels of charge in the range of charge-related masses m/z extending from about 500 u to 800 u, transients with usable durations of between 10 and 20 seconds, and even much more, can be achieved. For instance, using a magnetic field of 7 tesla, single spectra of reserpine (M=608.7 u) were achieved with a resolution of R=6,000,000, without peak coalescence, from a transient that had hardly decayed over 20 seconds.

FIG. 4 illustrates mass spectra of [$Arg^8$]-vasopressin ($C_{46}H_{67}N_{15}O_{12}S_2$). In the upper part, FIG. 4*a* shows the transient, which could be measured here over 18 seconds. Below that (4*b*) a part of a mass spectrum is acquired over a mass range of 10 atomic mass units, showing the double-charged ions of [$Arg^8$]-vasopressin together with a few contaminating substances. In addition to the signal from the double-charged, monoisotopic ions of mass m/z=542.72620 u, the mass spectrum also shows the first and second $^{13}C$-satellites (m/z=543.22788 u and m/z=543.72956 u respectively). The mass resolution of R=2,000,000 was achieved by adjusting the ICR measuring cell in accordance with this invention. In mass spectrometry, the term "monoisotopic ions" refers to those ions that are composed only of the main isotopes of their elements, i.e. only of $^1H$, $^{12}C$, $^{14}N$, $^{16}O$, $^{31}P$, $^{32}S$ or $^{35}Cl$.

Figure 4A:
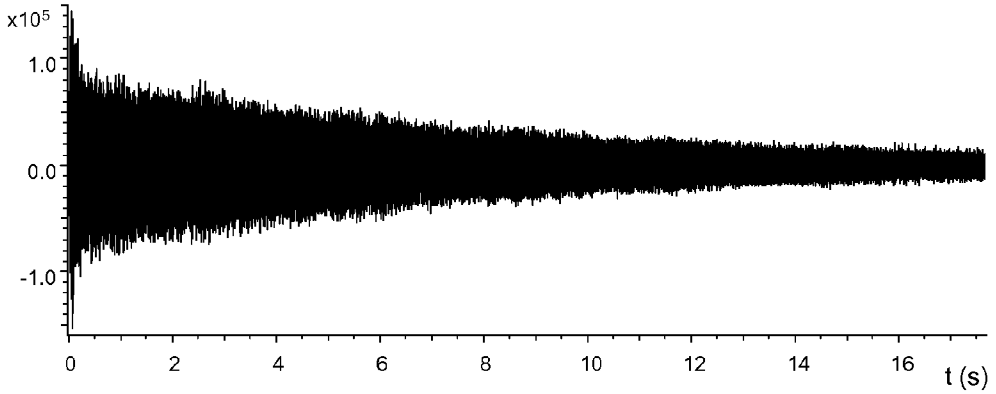
FIGS. 4*a*-4*d* exhibit a narrowband measurement taken on the substance [Arg8]-vasopressin ($C_{46}H_{67}N_{15}O_{12}S_2$) with a mass resolution of R=2,000,000 in a magnetic field of just seven tesla. The illustration shows at the top (as FIG. 4*a*) the 18 seconds of transient, underneath (as FIG. 4*b*) the mass spectrum of the double-charged molecular ions, and below that (as FIG. 4*c*) a zoom of the fine structure of the second $^{13}C$-satellite. For comparison.
Figure 4B:
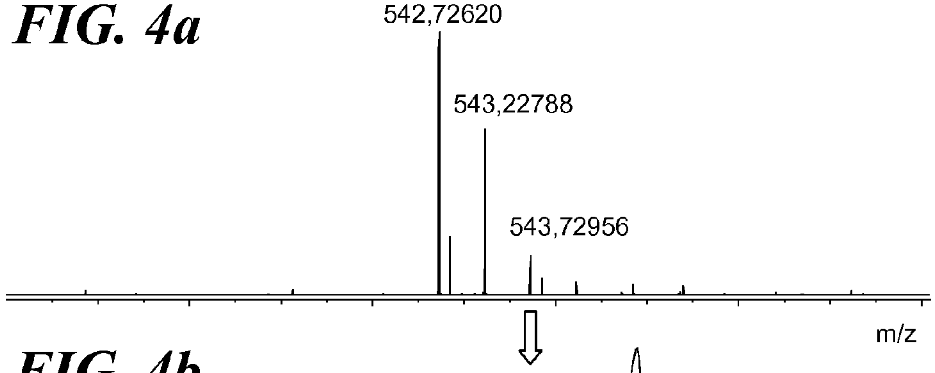
Figure 4C:
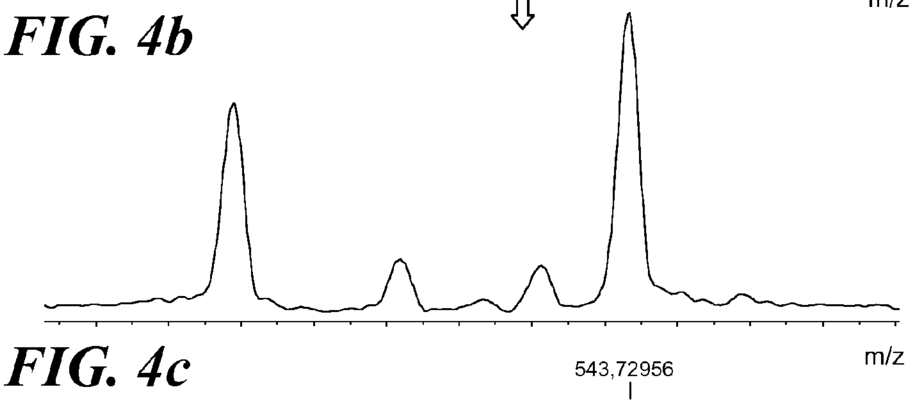
Figure 4D:
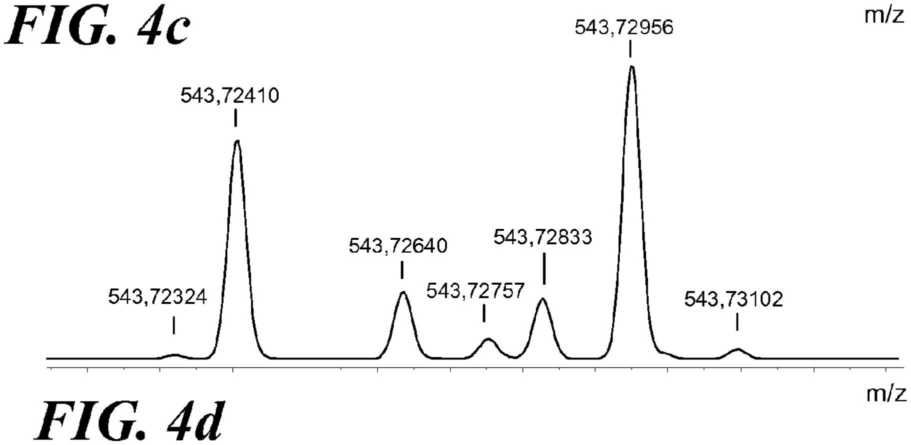

Below that, FIG. 4*c* shows the fine structure of the second $^{13}C$-satellite, as a zoom of the mass spectrum shown in FIG. 4*b*. The fine structure is based on the fact that the signal contains peaks not only from ions that contain two $^{13}C$ atoms instead of two $^{12}C$ atoms, but also peaks from ions with $^{18}O$ instead of $^{16}O$, $^{34}S$ instead of $^{32}S$, $^{13}C^{15}N$ instead of $^{12}C^{14}N$, $^2D$ instead of $^1H_2$, and so on. The lowest part of the illustration, FIG. 4*d*, shows, for comparison, the fine structure calculated theoretically on the basis of the known isotopic composition. The good agreement with FIG. 4*c* can easily be seen. For unknown substances, the measurement of such a fine structure makes it easy to determine the elements involved, something that would be hard to find using other methods.

It should be noted here that the technical expert finds it very surprising that the work from Brustkern et al. does not illustrate the fine structure of the satellite signals of [$Arg^8$]-vasopressin. A mass resolution of R=17,000,000 was given for the [$Arg^8$]-vasopressin signal. A fine structure with such high mass resolution would be a sensation amongst the experts. This indicates that this signal might be subject to peak coalescence, not permitting the determination of any fine structure.

Figure 5A:
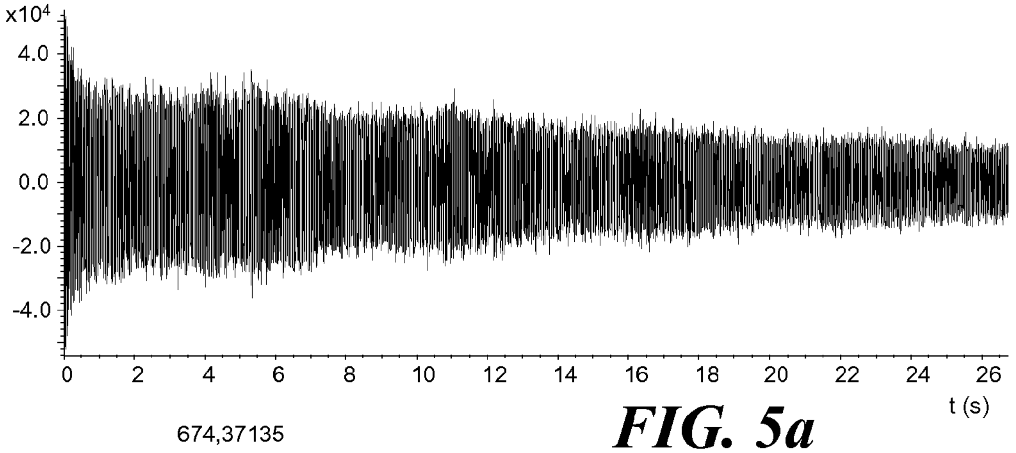
FIGS. 5*a*-5*d* exhibit a narrowband measurement taken on a substance P.
Figure 5B:
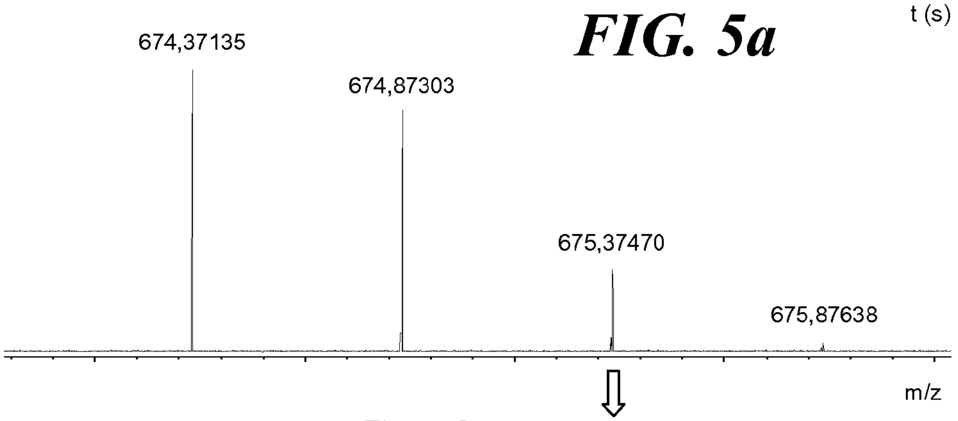
Figure 5C:
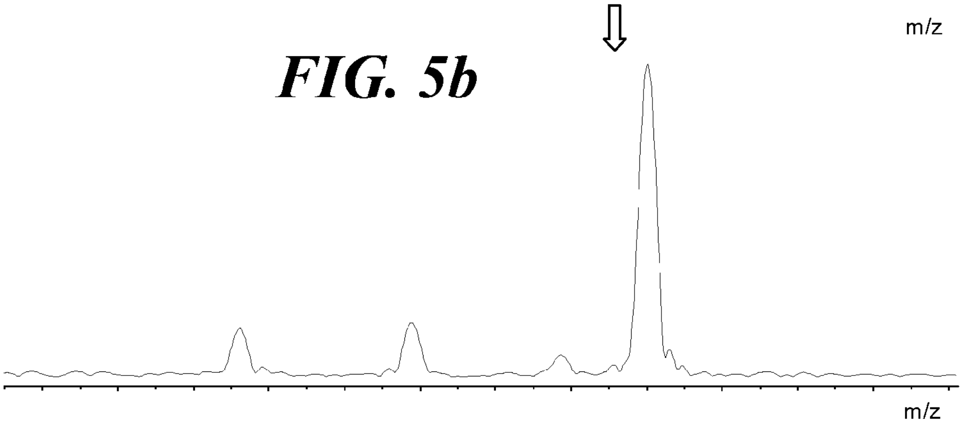
Figure 5D:
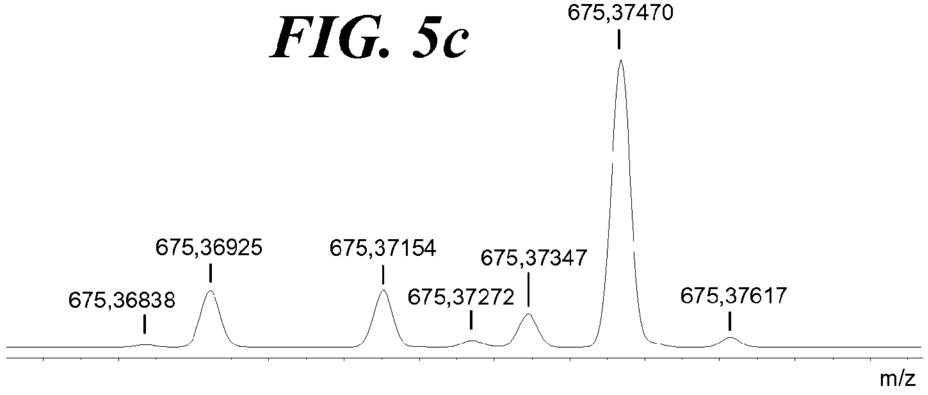

FIGS. 5*a* to 5*d* illustrate the same scheme for substance P ($C_{63}H_{100}N_{18}O_{13}S$). FIG. 5*c* illustrates the fine structure of the second $^{13}C$-satellites for the double-charged ions of substance P that was obtained with a mass resolution of R=2,500,000, in comparison with the theoretically calculated fine structure shown in FIG. 5*d*.

Figure 6:
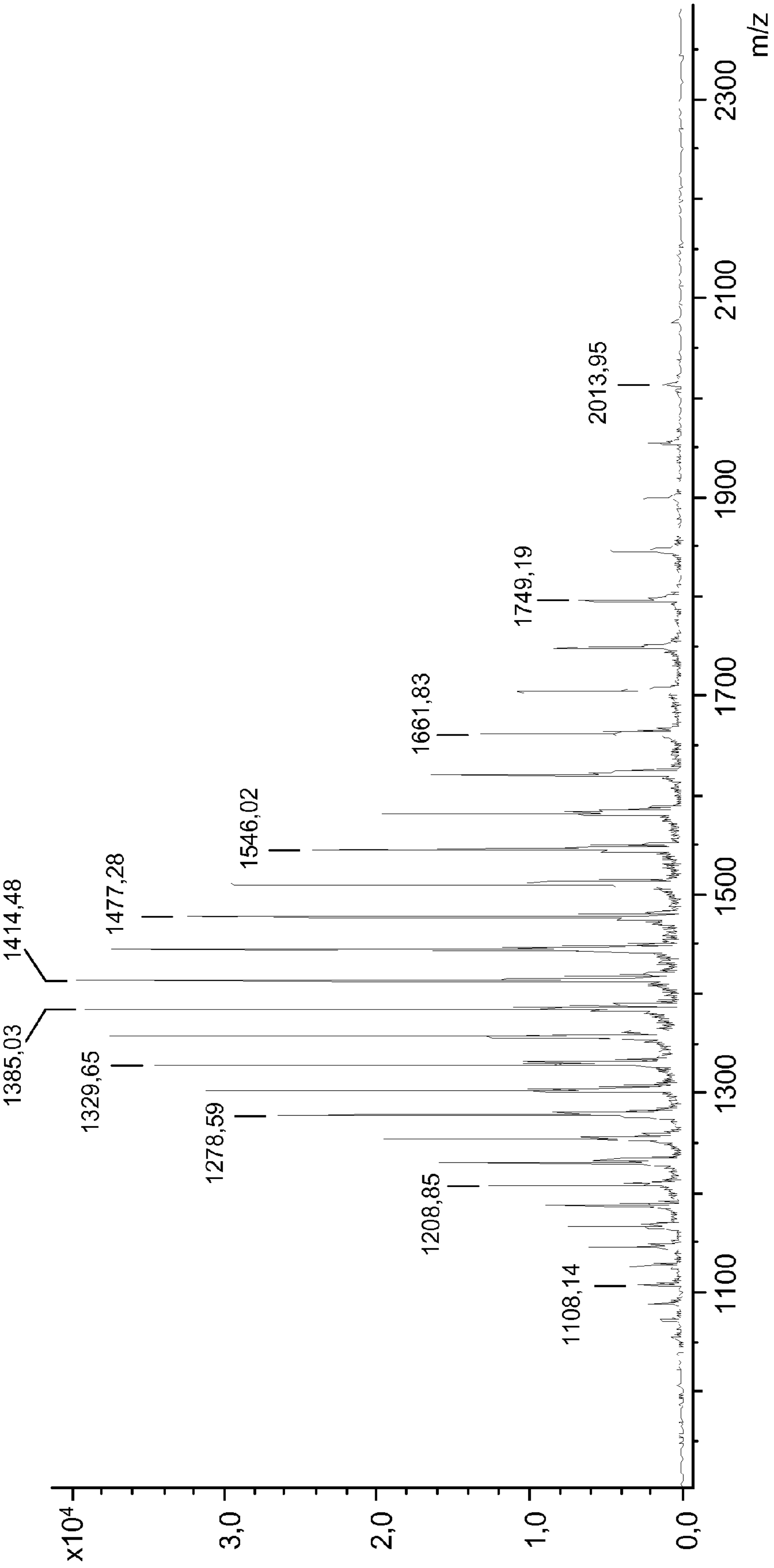
FIG. 6 shows a broadband mass spectrum of BSA (bovine serum albumin), with a molecular weight of M=66, 432.45558 u, obtained in preparation for acquiring the mass spectrum of one isotope group alone with the highest possible resolution.

For substances with much higher masses, generally in the order of a few tens of thousands of atomic mass units, usually a broadband acquisition of an overview spectrum is followed by an acquisition of a narrowband mass spectrum that displays only the ions of one level of charge at maximum resolution. A broadband mass spectrum for BSA (bovine serum albumin; molecular mass m=66,432.45558 u) is shown in FIG. 6.

Figure 7A:
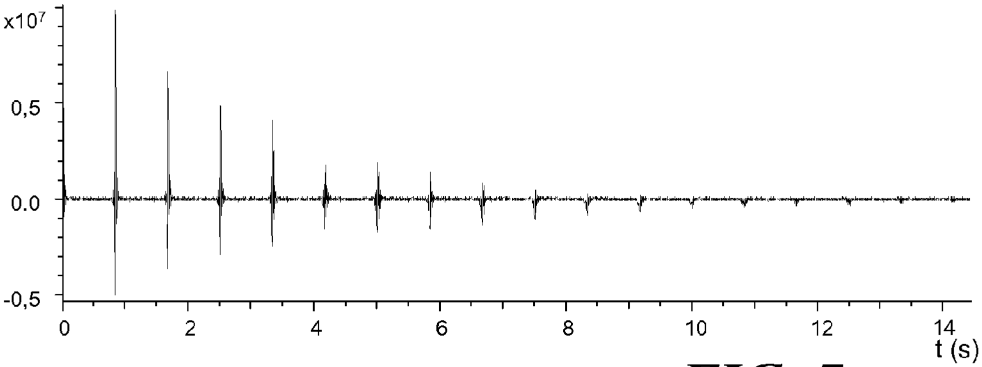
FIGS. 7*a*-7*d* illustrate the particularly difficult acquisition of the narrowband mass spectrum of an isotope group of BSA, in fact the isotope group of the ions with 49 charges whose monoisotopic signal peak is found at m/z=1355.90243 u. At the top.
Figure 7B:
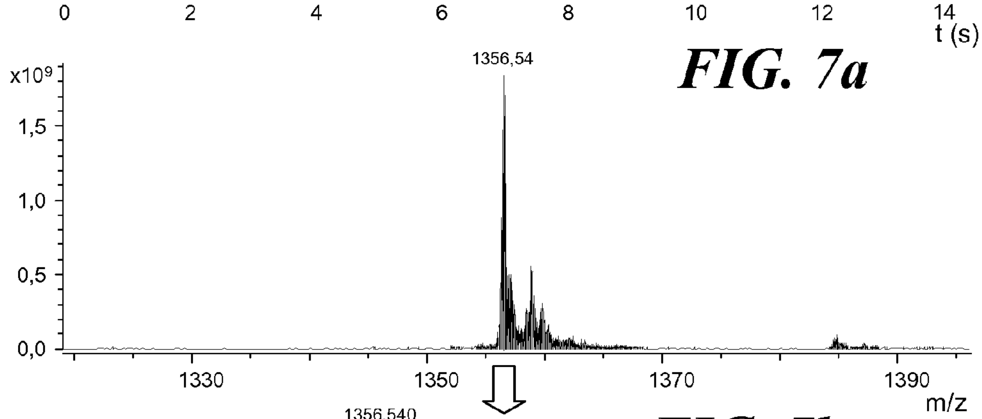
Figure 7C:
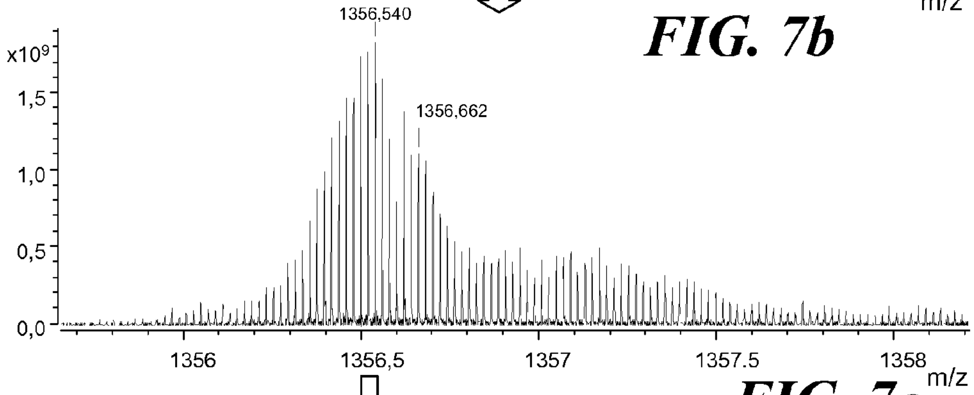
Figure 7D:
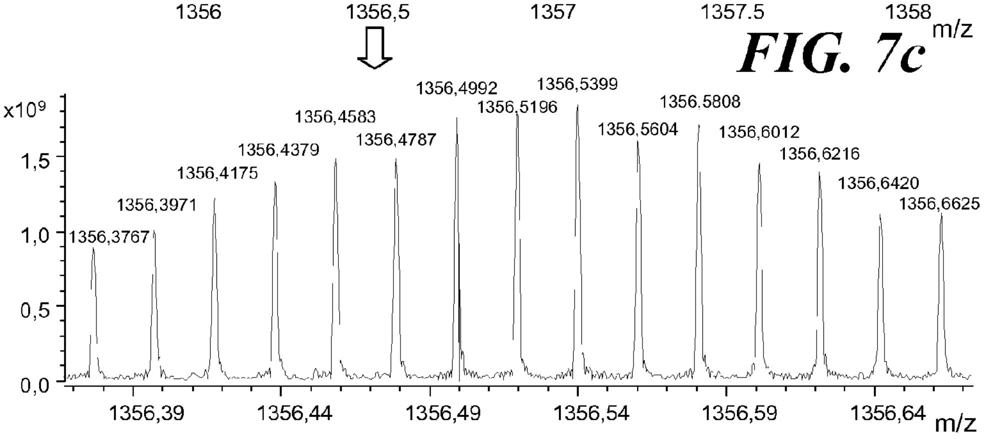

The ions of each charge level form an isotope group often having more than a hundred isotope satellites. Since the ions of these isotope groups each differ by one mass unit (or, more precisely, by the difference in mass between $^{12}C$ and $^{13}C$), we find a very regularly structured mixture of ions that provide a transient of a highly unusual type when subjected to narrowband measurement. As can be seen in FIG. 7*a*, the transient consists of a sequence of individual "beats". Formation of these beats impairs the resolution of the mass spectrum obtained from them. The beats require that the electronics, most particularly the analog-to-digital converter, have a particularly high dynamic measuring range. Nevertheless, using this invention in an adjusted measuring cell, as illustrated in FIGS. 7*b*, 7*c* and 7*d*, a mass spectrum of the isotope signal from ions of BSA carrying 49 charges was measured with a mass resolution of R=800,000; 200 individual spectra, however, had to be added to achieve this. Successfully adding 200 individual spectra requires extraordinary stability from the electronics, but this was available in the instrument used.

The beats are caused by interference between the ions as they circulate. When they are excited, the ions are first lifted onto a cyclotron track in which all the clouds of ions are initially positioned very closely together, giving rise to a high image current signal: the beat. The clouds of ions only differ from one another by a relatively tiny mass, and therefore move with a tiny difference in speed. They therefore move gradually apart, and distribute themselves evenly around the entire cyclotron track. When evenly distributed, the image current signals cancel each other out almost entirely. All the satellite ions of the same charge level of BSA come together again after 66,389 orbits, during which the first satellite has made one orbit less, the second satellite two orbits less, the third satellite three orbits less and so on. This gives rise to the second beat; after another 66,390 circuits, a third beat occurs, and so forth.

Without the adjustment in accordance with this convention, it is generally only possible to measure transients with one or two beats for the isotope groups of such substances. Measuring 18 beats is extraordinarily good, and has not been achieved before.

Mass spectra such as those shown in FIGS. 7*b* and 7*c* make it possible to determine whether a single substance of high molecular weight is involved, or a mixture. Substances like this with high molecular weights are often not pure, but contain, in addition to the basic substance, oxidized or other derivative molecules, or they may be bonded to associated molecules with a lower molecular weight. Analyses of this type can be made on the basis of these mass spectra. Measuring them successfully is therefore of more than purely academic interest.

Moreover, transients with beats can not be arbitrarily shortened with a proportional reduction in mass resolution. Each beat that is no longer available for the Fourier transform leads to a sharp drop in mass resolution.

The technical expert, with the knowledge of this invention, will be able to develop further advantageous analytical methods using corresponding ICR measuring cells with compensation electrodes. It is also possible to develop other types of ICR measuring cell. The compensation electrodes can, for instance, also be implemented as annular parts of the planar screening electrode. The potential supply to these compensation electrodes can also be set optimally for maximum mass resolution using the adjustment method of this invention.

What is claimed is:

1. A method for adjusting potentials at compensation electrodes of an ICR measuring cell in order to acquire ICR mass spectra with very high mass resolution, comprising:
- (a) applying an initial potential to the compensation electrodes;
- (b) filling the ICR cell with ions and measuring an ICR transient;
- (c) determining the usable time duration of the measured ICR transient;
- (d) adjusting the potentials at the compensation electrodes; and
- (e) repeating steps (b)-(d) until the determined time duration reaches a maximum.

2. The method of claim 1, wherein step (c) is performed by a computer operating under control of a computer program.

3. The method of claim 2, wherein step (d) is performed by the computer operating under control of the computer program.

4. The method of claim 1, wherein step (b) comprises filling the ICR cell with a same number of ions for each measurement.

5. A method for acquiring an ICR mass spectrum with high mass resolution, comprising:
- (a) providing an ICR measuring cell having compensation electrodes;
- (b) applying an initial potential to the compensation electrodes;
- (c) filling the ICR cell with ions and measuring an ICR transient;
- (d) determining the usable time duration of the measured ICR transient;
- (e) adjusting the potentials at the compensation electrodes;
- (f) repeating steps (c)-(e) until the determined time duration reaches a maximum; and
- (g) acquiring the ICR mass spectrum with the ICR measuring cell having compensation potentials as determined in steps (c)-(f).

6. The method of claim 5, wherein steps (b)-(f) are repeated when there is a change of process parameters for the mass spectrum acquisition in step (g).

7. The method of claim 5, wherein, in step (a), an ICR measuring cell is provided having at least four rows of longitudinal electrodes, each longitudinal electrode being divided into at least five segments and wherein the electrodes of the segments between a central segment and outermost segments constitute the compensation electrodes.

8. The method of claim 7, wherein, in step (a), an ICR measuring cell having one of four, six, eight, ten and twelve rows of longitudinal electrodes is provided.

9. The method of claim 5, wherein, in step (a), an ICR measuring cell is provided being formed by rows of longitudinal electrodes, each longitudinal electrode being divided into segments, wherein a number and length of the segments selected so that steps (a)-(f) yields a longest usable transient.

10. The method of claim 5, wherein step (c) comprises filling the ICR cell with a same number of ions for each measurement.

11. The method of claim 10 wherein, in step (g), the ICR measuring cell is filled with the same number of ions as used in step (c).

12. A method for adjusting potentials at compensation electrodes of an ICR measuring cell in order to acquire ICR mass spectra with very high mass resolution, comprising:

(a) applying an initial potential to the compensation electrodes;

(b) filling the ICR cell with ions and performing an ICR image current measurement;

(c) determining the mass resolution of the ICR image current measurement;

(d) adjusting the potentials at the compensation electrodes; and (e) repeating steps (b)-(d) until the determined mass resolution reaches a maximum.

13. The method of claim 12, wherein, in step (b), ICR image current measurements are performed with measuring times of a same duration.

* * * * *